US012755004B2

(12) United States Patent
Ilangovan

(10) Patent No.: US 12,755,004 B2
(45) Date of Patent: Oct. 6, 2026

(54) SYSTEM AND METHOD FOR UNAUTHORIZED ACCESS MITIGATION THROUGH INSTANTIATING A SECURITY INTERFACE

(71) Applicant: Bank of America Corporation, Charlotte, NC (US)

(72) Inventor: Votreeshwaran Ilangovan, Chester (GB)

(73) Assignee: Bank of America Corporation, Charlotte, NC (US)

(*) Notice: Subject to any disclaimer, the term of this patent is extended or adjusted under 35 U.S.C. 154(b) by 32 days.

(21) Appl. No.: 19/061,240

(22) Filed: Feb. 24, 2025

(65) Prior Publication Data

US 2026/0252683 A1 Aug. 27, 2026

(51) Int. Cl.
*G06F 21/55* (2013.01)
*H04L 9/08* (2006.01)

(52) U.S. Cl.
CPC ............ *G06F 21/55* (2013.01); *H04L 9/0872* (2013.01)

(58) Field of Classification Search
CPC ........... G06F 21/55–554; G06F 21/629; H04L 9/0872
See application file for complete search history.

(56) References Cited

U.S. PATENT DOCUMENTS 7,540,021 B2 5/2009 Page
8,225,290 B2 7/2012 Pensak et al.
8,613,080 B2 12/2013 Wysopal et al.
9,609,459 B2 3/2017 Raleigh
10,380,368 B1 8/2019 Sampson
10,530,811 B2 1/2020 Black et al.
10,783,041 B2 9/2020 McCormack
11,537,753 B2 12/2022 Creti et al.
11,625,488 B2 4/2023 Ting et al.
11,741,226 B2 8/2023 Dixit
2012/0139693 A1 6/2012 Zucker et al.
2012/0151553 A1 6/2012 Burgess et al.
2012/0167164 A1 6/2012 Burgess et al.
(Continued)

FOREIGN PATENT DOCUMENTS

CN 115865511 A * 3/2023
EP 4332800 A1 6/2024

*Primary Examiner* — Trong H Nguyen

(57) ABSTRACT

A system to instantiate a security interface for a software application is disclosed. The system receives a request to clone the software application. In response, the system parses the source code of the software application to detect user interface elements and operations. The system instantiates the clone software application that emulates the interface and operations of the software application. The system deploys the clone software application to a computing device and tracks user interactions with the clone software application. The system derives an interaction pattern from the user interactions and compares the derived interaction pattern with previously known interaction pattern. If the derived interaction pattern deviates from the previously known interaction pattern, the system classifies the interaction session as anomalous. In response, the system displays pseudo data on the clone software application instead of expected data. The system invokes a countermeasure protocol to address the anomalous session.

20 Claims, 3 Drawing Sheets

(56) References Cited

U.S. PATENT DOCUMENTS

| | | | |
|---|---|---|---|
| 2013/0133026 | A1 | 5/2013 | Burgess |
| 2013/0160079 | A1 * | 6/2013 | Hebert .................. H04L 63/145 726/3 |
| 2014/0201526 | A1 | 7/2014 | Burgess |
| 2015/0205962 | A1 | 7/2015 | Swidowski et al. |
| 2016/0232347 | A1 | 8/2016 | Badishi |
| 2019/0215337 | A1 * | 7/2019 | Trabelsi .............. H04L 63/1491 |
| 2021/0026969 | A1 | 1/2021 | Hod et al. |
| 2021/0157917 | A1 * | 5/2021 | Hebert .................. G06F 21/554 |
| 2021/0358244 | A1 | 11/2021 | Chafni et al. |
| 2024/0078294 | A1 | 3/2024 | Meerwald-Stadler et al. |
| 2025/0005143 | A1 | 1/2025 | Strogov et al. |

* cited by examiner

200

SYSTEM AND METHOD FOR UNAUTHORIZED ACCESS MITIGATION THROUGH INSTANTIATING A SECURITY INTERFACE

TECHNICAL FIELD

The present disclosure relates generally to network security, and more specifically to a system and method for unauthorized access mitigation through instantiating a security interface.

BACKGROUND

Software applications are used to provide data to users. With the expansion of wireless communication and new technologies, securing software applications from sophisticated cyber-attacks has become more challenging.

SUMMARY

The disclosed system, described in the present disclosure, is particularly integrated into practical applications to provide technological improvements to conventional unauthorized access detection and mitigation techniques.

In conventional user authentication techniques, if a bad actor gets hold of a legitimate user's credentials and accesses a software application through the user's credentials, the bad actor can perform any operation within the legitimate user's profile, such as data exfiltration, access sensitive information accessible from the user's profile, among others. The conventional user authentication methods may implement static authentication methods, such as multi-factor authentication, at the initial authentication stage. However, if the bad actor somehow is able to bypass the initial authentication stage, the bad actor is given the opportunity to perform any operation within the legitimate user's profile—in a falsely authenticated session. Thus, the conventional user authentication methods fail to detect unauthorized users while in the falsely authenticated session with the software application. Further, if some user authentication methods are successful in detecting and blocking an unauthorized attempt to access a software application by a bad actor, the bad actor may continue their effort to breach the security authentication barrier. Thus, in multiple hacking attempts, such as brute force hacking methods, bad actors can bypass the conventional user authentication methods.

The disclosed system is configured to provide a technical solution to these and other technical problems in conventional unauthorized access detection and mitigation techniques. The technical advantages and improvements over the conventional techniques are described below in conjunction with certain embodiments of the disclosed system.

In some embodiments, the disclosed system is configured to instantiate a clone of a source software application as a security layer, barrier, or interface between users and the source software application. The disclosed system dynamically generates and instantiates the clone of any given software application and presents the clone software application to users before allowing the users to access the source software application. While the user is interacting with the clone software application, the disclosed system tracks the user interaction pattern with the clone software application. For example, the disclosed system captures the navigation through different interface pages, interface elements, keyboard strokes, mouse movement and trajectory, network address (e.g., internet protocol (IP) address), and geographical location of the computing device from which the clone software application is being accessed, a timestamp of the interaction session with the clone software application, among others. During this interaction with the clone software application, the disclosed system may present virtual or pseudo data on various fields of the clone software application in response to the tracked user interactions, instead of the actual or expected output that the source software application would generate. The disclosed system continuously tracks and captures the user's interactions with the clone software application over a period of time and determines whether the captured user's interaction pattern deviates from the previously known interaction pattern of the authorized user. If the deviation between the captured user's interaction pattern and the previously known interaction pattern is more than a preconfigured threshold percentage, the disclosed system may determine that the user is a bad actor and is not authorized to access the source software application.

In response, the disclosed system may automatically invoke a security countermeasure protocol through system-level command code to address and mitigate the unauthorized attempt to access the source software application. For example, the disclosed system may communicate alert messages to the legitimate user's device and network administrators to provide information about the detected unauthorized session with the clone software application with the credentials of the legitimate user. In the same or another example, the disclosed system may tag the network address (e.g., IP address) associated with the computing device from which the clone software application is being accessed as anomalous or compromised.

In some embodiments, the disclosed system is configured to reroute any network packet (e.g., user interaction) to a designated endpoint (e.g., Uniform Resource Locator (URL) endpoint, API endpoint, WebSocket) associated with the clone software application instead of the source software application. Thus, the clone software application is used as the receiving end of the user interactions. Thus, even if a bad actor runs a brute-force cyberattack to access the source software application via a legitimate user profile, the network packets of the cyberattack are routed to the clone software application. Thus, the source software application and the user profile of the legitimate user are kept secure from the malicious network packets within the cyberattack.

In this manner, the disclosed system provides technical improvements to the conventional unauthorized access detection and mitigation techniques by implementing a dynamic security layer for each software application that proactively verifies users during an interaction session with a clone software application rather than solely relying on static authentication methods implemented by the conventional authentication methods. Further, by implementing the disclosed system, the bad actor is not aware that they are interacting with a clone software application, instead of the source software application. Thus, the bad actor would not retry to access the source software application. Thus, by implementing the disclosed system, the security of the source software applications and sensitive information accessible from the source software application is increased. In particular, increasing securing against cyber threats provides technical benefits, such as protecting sensitive data from unauthorized access, which can increase the accuracy and consistency of stored data by preventing unauthorized modifications and can also help against the loss of data due to data exfiltration. Other technical benefits include minimizing system downtime due to cyber-attacks and enabling faster and more effective incident response. These benefits lead to additional technical benefits such as enhanced network resilience, increased operational continuity, and faster recovery times. By proactively identifying and addressing potential issues, minimizing system downtime strengthens the overall stability and reliability of the system, reducing the likelihood of unexpected outages. Effective monitoring and rapid response mechanisms allow for quicker restoration of system functionality in case of failures, minimizing the impact of any downtime that does occur. Reduced downtime also helps prevent data loss by ensuring consistent system operation and reducing the risk of corruption during unexpected outages. Monitoring system performance during uptime enables identification of bottlenecks and potential issues, allowing for proactive optimization and improved overall system efficiency. With a robust system that minimizes downtime, entities can more easily scale operations and adapt to changing demands without significant disruptions.

In some embodiments, a system comprises a memory operably coupled with a processor. The memory is configured to store the first software application comprising a first user interface comprising a first web page, wherein the first web page comprises a first set of user interface elements. The first software application is associated with a first source code to render the first user interface and perform a first operation. The processor is configured to electronically receive a request to clone the first software application. The processor is further configured to parse the first source code in response to receiving the request. In some embodiments, parsing the first source code comprises detecting a programming language in which the first source code is written based at least in part upon a syntax rule associated with the programming language; detecting a set of characters within the first source code, wherein the set of characters comprises a set of words and a set of operators; detecting a dependency between two or more characters in each portion of the first source code according to the syntax rule, wherein each portion of the first source code comprises one or more lines of code; and determining an operation of each portion of the first source code based at least in part upon the detected dependency within each portion of the first source code. In some embodiments, detecting the first set of user interface elements and the first operation comprises detecting, from among the set of words, a set of tags that are predefined, according to the syntax rule, to be indicative of the first set of user interface elements, wherein each tag from among the set of tags is indicative of a respective user interface element; and for at least a first tag, detecting a set of visual attributes associated with a first user interface element, wherein the set of visual attributes comprises at least one of a size, color, or a location associated with the first user interface element. The processor is further configured to detect the first set of user interface elements and the first operation. In some embodiments, detecting the first set of user interface elements and the first operation comprises detecting, from among the set of words, a set of tags that are predefined, according to the syntax rule, to be indicative of the first set of user interface elements, wherein each tag from among the set of tags is indicative of a respective user interface element; and for at least a first tag, detecting a set of visual attributes associated with a first user interface element, wherein the set of visual attributes comprises at least one of a size, color, or a location associated with the first user interface element.

The processor is further configured to instantiate a second software application as a clone of the first software application. In some embodiments, instantiating the second software application comprises invoking a second user interface that corresponds to the first user interface, wherein the second user interface comprises a second set of user interface elements; and configuring each of the second set of user interface elements to operate as a counterpart user interface element from among the first set of user interface elements. The processor is further configured to electronically receive a request message to access the first software application that is hosted on a computing device, wherein the request message comprises a credential associated with a first user. The processor is further configured to deploy the second software application to the computing device in response to receiving the request message. The processor is further configured to autonomously capture a set of user interactions on the second software application, wherein the set of user interactions indicates navigating on the second user interface. The processor is further configured to derive an interaction pattern from the captured set of user interactions. The processor is further configured to evaluate the derived interaction pattern against a previously known interaction pattern associated with the credential of the first user. The processor is further configured to detect a deviation between the derived interaction pattern and the previously known interaction pattern. The processor is further configured to establish that the deviation between the determined interaction pattern and the previously known interaction pattern is more than a threshold percentage. The processor is further configured to classify a first user interaction session associated with the derived interaction pattern as anomalous in response to establishing that the deviation between the derived interaction pattern and the previously known interaction pattern is more than the threshold percentage. The processor is further configured to facilitate an execution of the first operation on the second software application. The processor is further configured to display, on the second user interface, pseudo data in response to the captured set of user interactions, wherein the pseudo data reflects an expected format of an output of the first operation on the first software application. The processor is further configured to automatically invoke a countermeasure protocol through a system-level command code. The system-level command code is preconfigured, when executed by the processor, to cause the processor to invoke a set of application-level code commands to invoke the countermeasure protocol. The system-level command codes comprise software instructions that are interpreted by an operating system (OS) library to invoke system-level operations. The application-level command code comprises software instructions that are interpreted by the second software application to invoke application-specific operations comprising the countermeasure protocol.

Some embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
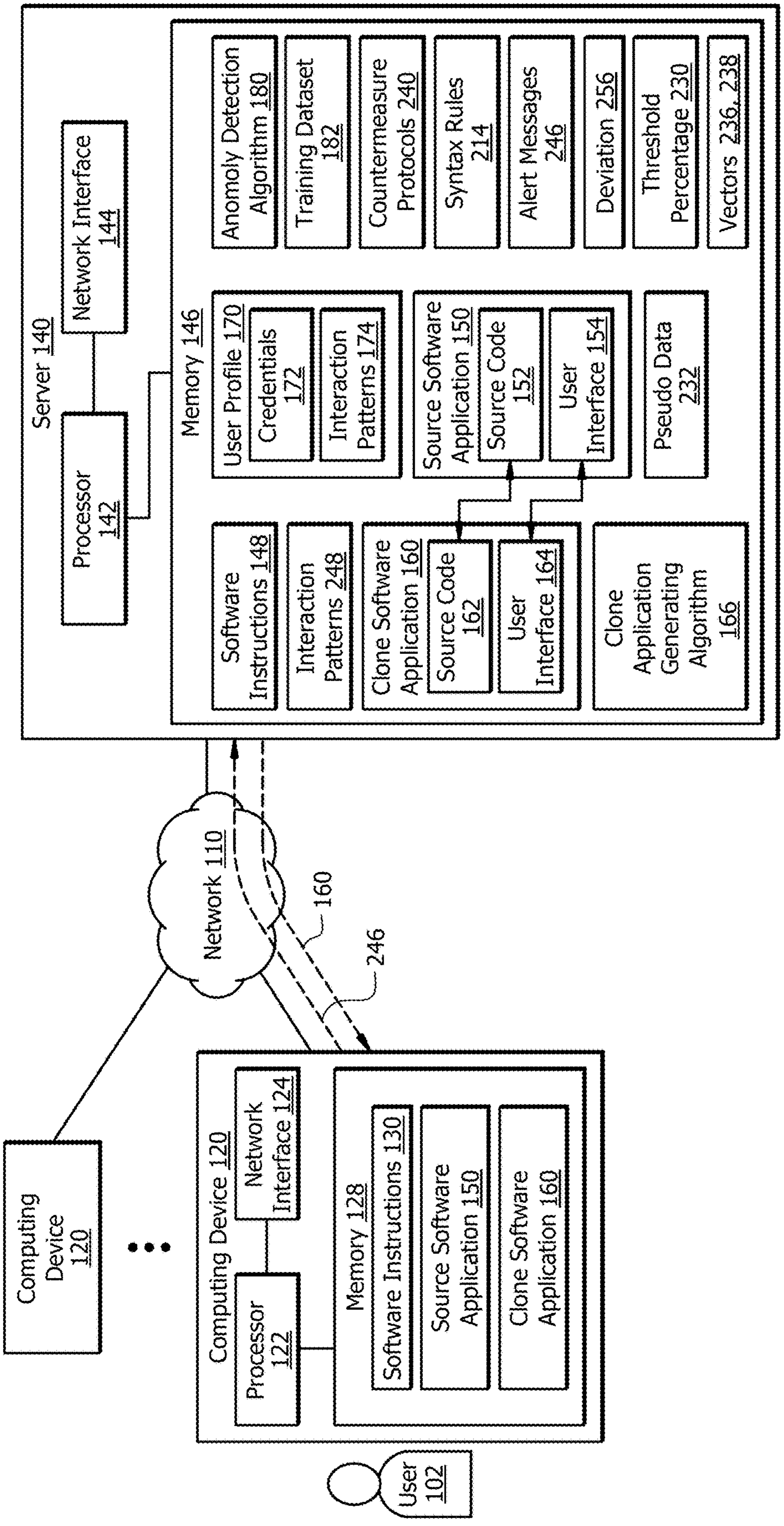
FIG. 1 illustrates an embodiment of a system configured for unauthorized access mitigation through instantiating a security interface.
Figure 2:
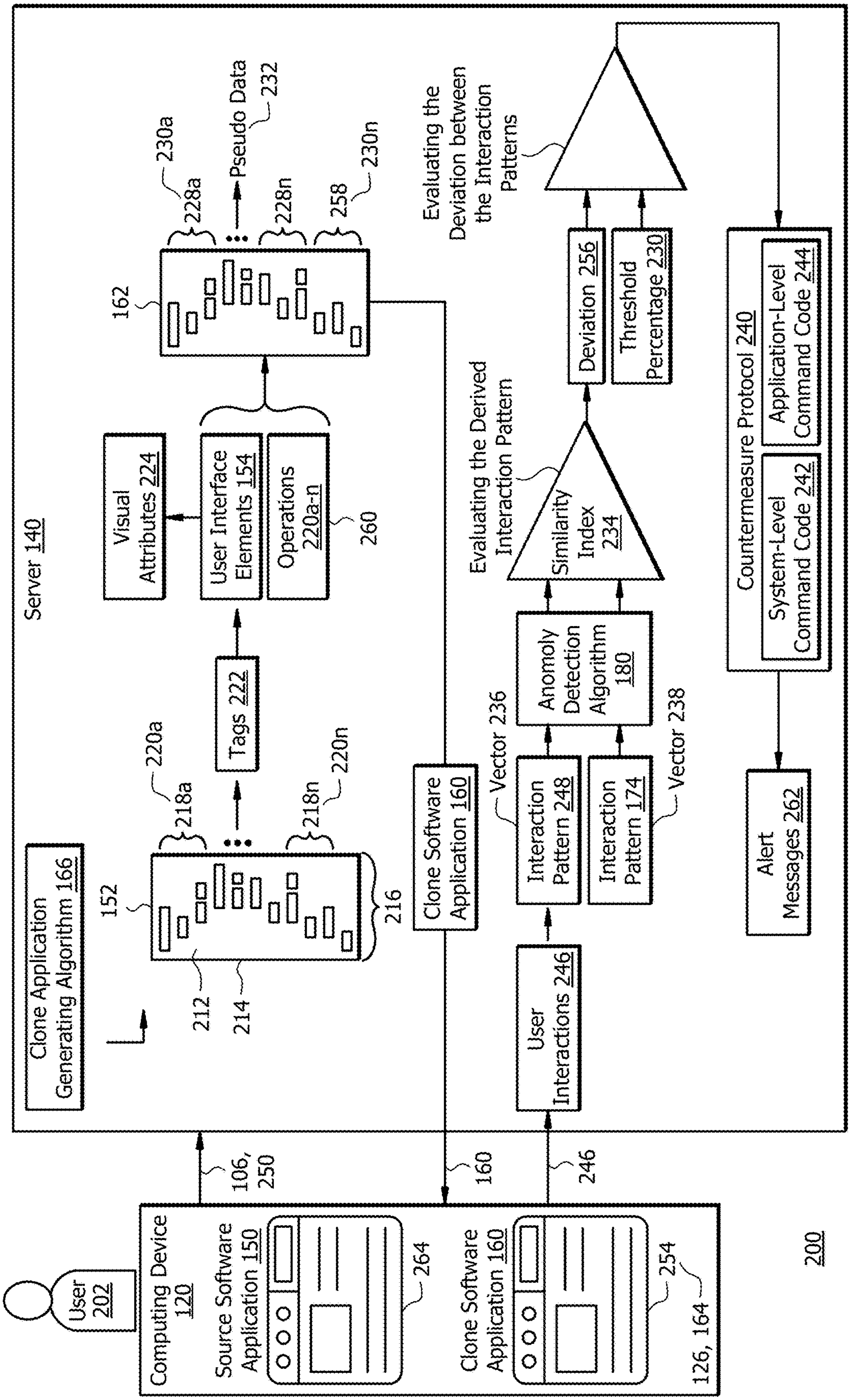
FIG. 2 illustrates an example operational flow of the system of FIG. 1 for unauthorized access mitigation through instantiating a security interface.
Figure 3:
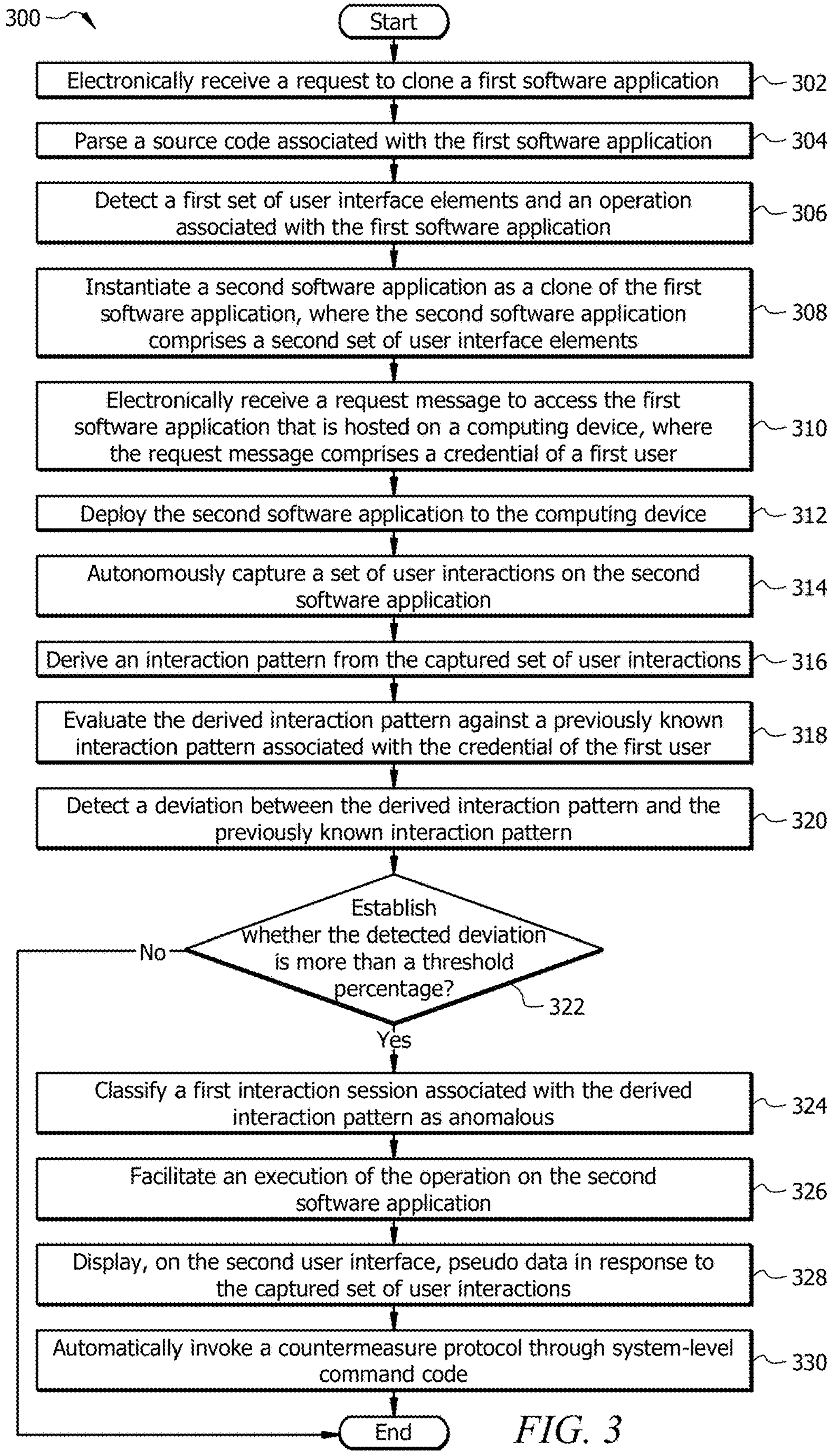
FIG. 3 illustrates an example flow chart of a method of the system of FIG. 1 for unauthorized access mitigation through instantiating a security interface.

As described above, previous technologies fail to provide efficient and reliable solutions for instantiating a clone of a source software application. Embodiments of the present disclosure and its advantages may be understood by referring to FIGS. 1 through 3. FIGS. 1 through 3 are used to describe systems and methods for instantiating a clone of a source software application, according to some embodiments.

System Overview

FIG. 1 illustrates an embodiment of a system 100 that is generally configured to improve the data security and network security techniques by instantiating clones of source software applications 150 as an additional security layer or interface, instead of granting users access to the source software applications 150. In some embodiments, the system 100 comprises one or more servers 140 communicatively coupled with one or more computing devices 120 via a network 110. The network 110 enables communication among the components of the system 100. Each computing device 120 may be used to provide users 102 access to various software applications. The server 140 may be configured to clone each software application 150 and deploy the clone software application 160 to computing devices 120, capture interactions 246 with the clone software applications 160, derive an interaction pattern 248 from the captured interactions 266, determine whether a user request access to the source software application 150 is a legitimate user with an authorization to access the source software application 150 by comparing the derived interaction pattern 248 with a previously known interaction pattern 174 of the authorized user. If the deviation 256 between the derived interaction pattern 248 and the previously known interaction pattern 174 of the authorized use is more than a threshold percentage 230, the server 140 may determine that the user is not authorized to access the source software application 150. In response, the server 140 may invoke countermeasure protocols 240 to address the unauthorized attempt to access the source software application 150. In other embodiments, system 100 may not have all of the components listed and/or may have other elements instead of, or in addition to, those listed above.

In general, the disclosed system 100 provides technological improvements to conventional unauthorized access detection and mitigation techniques. In conventional user authentication techniques, if a bad actor gets hold of a legitimate user's credentials and accesses a software application through the user's credentials, the bad actor can perform any operation within the legitimate user's profile, such as data exfiltration, access sensitive information accessible from the user's profile, among others. The conventional user authentication methods may implement static authentication methods, such as multi-factor authentication, at the initial authentication stage. However, if the bad actor somehow is able to bypass the initial authentication stage, the bad actor is given the opportunity to perform any operation within the legitimate user's profile—in a falsely-authenticated session. Thus, the conventional user authentication methods fail to detect unauthorized users while in the falsely authenticated session with the software application. Further, if some user authentication methods are successful in detecting and blocking an unauthorized attempt to access a software application by a bad actor, the bad actor may continue its effort to breach the security authentication barrier. Thus, in multiple hacking attempts, such as brute force hacking methods, bad actors can bypass the conventional user authentication methods.

The disclosed system is configured to provide a technical solution to these and other technical problems in conventional unauthorized access detection and mitigation techniques. The technical advantages and improvements over the conventional techniques are described below in conjunction with certain embodiments of the disclosed system.

In some embodiments, the disclosed system 100 is configured to instantiate a clone of a source software application 150 as a security layer, barrier, or interface between users and the source software application 150. The disclosed system 100 dynamically generates and instantiates the clone of any given software application 150 and presents the clone software application 160 to users before allowing the users to access the source software application 150. While the user is interacting with the clone software application 160, the disclosed system 100 tracks the user interaction pattern 248 with the clone software application 160. For example, the disclosed system 100 captures the navigation through different interface pages, interface elements, keyboard strokes, mouse movement and trajectory, detected network address (e.g., internet protocol (IP) address), and detected geographical location of the computing device 120 from which the clone software application 160 is being accessed, a detected timestamp of the interaction session with the clone software application 160, among others. During this interaction with the clone software application 160, the disclosed system 100 may present virtual or pseudo data 232 on various fields of the clone software application 160 in response to the tracked user interactions 246, instead of the actual or expected output that the source software application 150 would generate. The disclosed system 100 continuously tracks and captures the user's interactions 246 with the clone software application 160 over a period of time and determines whether the captured user's interaction pattern 248 deviates from the previously known interaction pattern 147 of the authorized user. If the deviation 256 between the captured user's interaction pattern 248 and the previously known interaction pattern 174 is more than a preconfigured threshold percentage 230, the disclosed system 100 may determine that the user is a bad actor and is not authorized to access the source software application 150.

In response, the disclosed system 100 may automatically invoke a security countermeasure protocol 240 through a system-level command code to address and mitigate the unauthorized attempt to access the source software application 150. For example, the disclosed system 100 may communicate alert messages to the legitimate user's device and network administrators to provide information about the detected unauthorized session with the clone software application 160 with the credentials 172 of the legitimate user 102. In the same or another example, the disclosed system 100 may tag the network address (e.g., IP address) associated with the computing device 120 from which the clone software application 160 is being accessed as anomalous or compromised.

In some embodiments, the disclosed system 100 is configured to reroute any network packet (e.g., user interaction) to a designated endpoint (e.g., Uniform Resource Locator (URL) endpoint, API endpoint, WebSocket) associated with the clone software application 160 instead of the source software application 150. Thus, the clone software application 160 is used as the receiving end of the user interactions. Thus, even if a bad actors runs a brute force cyberattack to access the source software application 150 via a legitimate user profile 170, the network packets of the cyberattack are routed to the clone software application 160. Thus, the source software application 150 and the user profile 170 of the legitimate user 102 are kept secure from the malicious network packets within the cyberattack.

In this manner, the disclosed system 100 provides technical improvements to the conventional unauthorized access detection and mitigation techniques by implementing a dynamic security layer for each software application 150 that proactively verifies users during an interaction session 252 with a clone software application 160 rather than solely relying on static authentication methods implemented by the conventional authentication methods. Further, by implementing the disclosed system 100, the bad actor is not aware that they are interacting with a clone software application 150, instead of the source software application 150. Thus, the bad actor would not retry to access the source software application 150. Thus, by implementing the disclosed system 100, the security of the source software applications and sensitive information accessible from the source software application is increased.

System Components

Network

Network 110 may be any suitable type of wireless and/or wired network. The network 110 may be connected to the Internet or public network. The network 110 may include all or a portion of an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a mobile telephone network (e.g., cellular networks, such as 4G or 5G), a plain old telephone (POT) network, a wireless data network (e.g., Wi-Fi, WiGig, WiMAX, etc.), a long-term evolution (LTE) network, a universal mobile telecommunications system (UMTS) network, a peer-to-peer (P2P) network, a Bluetooth network, a near-field communication (NFC) network, and/or any other suitable network. The network 110 may include fiber optics, optical fibers, and the like to implement quantum communication channels. The network 110 may be configured to support any suitable type of communication protocol as would be appreciated by one of ordinary skill in the art.

Example Computing Device

Each computing device 120 may generally be any device that is configured to process data and interact with users. Examples of the computing device 120 include, but are not limited to, a personal computer, a desktop computer, a workstation, a server, a laptop, a tablet computer, a mobile phone (such as a smartphone), smart glasses, Virtual Reality (VR) glasses, a virtual reality device, an augmented reality device, an Internet-of-Things (IoT) device, or any other suitable type of device. The computing device 120 may include a user interface, such as a display, a microphone, a camera, a keypad, or other appropriate terminal equipment usable by users. The users 102 may use the computing devices 120 to access software applications 150 and/or clone software applications 160.

The computing device 120 includes a processor 122 in signal communication with a network interface 124 and a memory 128 configured to perform any of the functions or actions of the computing device 120 described herein. The computing device 120 is configured to communicate with other devices and components of the system 100 via the network 110. Processor 122 comprises one or more processors. The processor 122 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). For example, one or more processors may be implemented in cloud devices, servers, virtual machines, and the like. The processor 122 may be a programmable logic device, a microcontroller, a microprocessor, or any suitable number and combination of the preceding. The one or more processors are configured to process data and may be implemented in hardware or software. For example, the processor 122 may be 8-bit, 16-bit, 32-bit, 64-bit, or of any other suitable architecture. The processor 122 may include an arithmetic logic unit (ALU) for performing arithmetic and logic operations. The processor 122 may register the supply operands to the ALU and store the results of ALU operations. The processor 122 may further include a control unit that fetches instructions from memory and executes them by directing the coordinated operations of the ALU, registers, and other components. The one or more processors are configured to implement various software instructions. For example, the one or more processors are configured to execute instructions (e.g., software instructions 130) to perform the operations of the computing device 120 described herein. In this way, processor 122 may be a special-purpose computer designed to implement the functions disclosed herein. In an embodiment, the processor 122 is implemented using logic units, FPGAs, ASICs, DSPs, or any other suitable hardware. The processor 122 is configured to operate as described in FIGS. 1-3. For example, the processor 122 may be configured to perform one or more operations of the operational flow 200 as described in FIG. 2, and one or more operations of the method 300 as described in FIG. 3.

Network interface 124 is configured to enable wired and/or wireless communications. The network interface 124 may be configured to communicate data between the computing device 120 and other devices, systems, or domains. For example, the network interface 124 may comprise an NFC interface, a Bluetooth interface, a Zigbee interface, a Z-wave interface, a radio-frequency identification (RFID) interface, a WIFI interface, a local area network (LAN) interface, a wide area network (WAN) interface, a metropolitan area network (MAN) interface, a personal area network (PAN) interface, a wireless PAN (WPAN) interface, a modem, a switch, and/or a router. The processor 122 may be configured to send and receive data using the network interface 124. The network interface 124 may be configured to use any suitable type of communication protocol.

The user interface 126 may generally be peripherals that accept input from users. In some examples, the user interface 126 may include a keyboard, a mouse, a display screen, and buttons, among others. The user may input data to the user interface 126. For example, the users may input their desired input to software applications. The display screen may generally be an electronic monitor or screen that is configured to present or display data, such as the software applications 150, clone software application 160, and the like. Examples of display screens may include liquid crystal display (LCD), light emitting diode (LED), organic LED (OLED), and the like. In some examples, the display screen may be a touch screen display that is configured to accept input from users.

The memory 128 may be a non-transitory computer-readable medium. The memory 128 may be volatile or non-volatile and may comprise read-only memory (ROM), random-access memory (RAM), ternary content-addressable memory (TCAM), dynamic random-access memory (DRAM), and/or static random-access memory (SRAM). The memory 128 may include one or more of a local database, a cloud database, a network-attached storage (NAS), etc. The memory 128 comprises one or more disks, tape drives, or solid-state drives, and may be used as an overflow data storage device, to store programs when such programs are selected for execution, and to store instructions and data that are read during program execution. The memory 128 may store any of the information described in FIGS. 1-3 along with any other data, instructions, logic, rules, or code operable to implement the function(s) described herein when executed by processor 122. For example, the memory 128 may store software instructions 130, source software applications 150, clone software applications 160, and/or any other data or instructions described herein. The software instructions 130 may comprise any suitable set of instructions, logic, rules, or code operable to execute the processor 122 and perform the functions described herein, such as some or all of those described in FIGS. 1-3.

The source software application 150 may be a mobile, a web, or software application. The source software application 150 may be configured to execute various operations 220*a-n*, such as data processing, data rendering, data simulation, and provide access to certain information, such as sensitive information that may be stored locally in memory 128 and/or remotely in remote databases and/or servers 140, communicating with other software applications 150 in other computing devices 120 and servers 140 via application programming interfaces (APIs), among others. Each clone software application 160 may be the clone or replicated version of the respective source software application 150. The clone software application 160 may be configured to emulate the source software application 150.

Example Server

The server 140 generally includes a hardware computer system configured to clone each software application and deploy the clone software application 160 to computing devices 120, capture interaction patterns 248 of users 202 with the clone software applications 160, determine whether a user 202 is a legitimate user 102 with an authorization to access the software application by comparing the captured interaction pattern 248 of the user with a previously known interaction pattern 174 of authorized user 102. If the deviation 256 between the captured interaction pattern 248 of the user 202 and the previously known interaction pattern 174 of authorized use 102 is more than a threshold percentage 230, the server 140 may determine that the user 202 is not authorized to access the source software application 150, according to certain embodiments. In certain embodiments, the server 140 may be implemented by a cluster of computing devices, such as virtual machines. For example, the server 140 may be implemented by a plurality of computing devices using distributed computing and/or cloud computing systems in a network. In certain embodiments, the server 140 may be configured to provide services and resources (e.g., data and/or hardware resources as described herein, etc.) to other components and devices.

The server 140 may comprise a processor 142 operably coupled with a network interface 144 and a memory 146. The processor 142 comprises one or more processors. The processor 142 is any electronic circuitry, including, but not limited to, state machines, one or more CPU chips, logic units, cores (e.g., a multi-core processor), FPGAs, ASICs, or DSPs. For example, one or more processors may be implemented in cloud devices, servers, virtual machines, and the like. The processor 142 may be a programmable logic device, a microcontroller, a microprocessor, or any suitable number and combination of the preceding. The one or more processors are configured to process data and may be implemented in hardware or software. For example, the processor 142 may be 8-bit, 16-bit, 32-bit, 64-bit, or of any other suitable architecture. The processor 142 may include an ALU for performing arithmetic and logic operations. The processor 142 may register the supply operands to the ALU and store the results of ALU operations. The processor 142 may further include a control unit that fetches instructions from memory and executes them by directing the coordinated operations of the ALU, registers, and other components. The one or more processors are configured to implement various software instructions. For example, the one or more processors are configured to execute instructions (e.g., software instructions 148) to perform the operations of the server 140 described herein. In this way, the processor 142 may be a special-purpose computer designed to implement the functions disclosed herein. In an embodiment, the processor 142 is implemented using logic units, FPGAs, ASICs, DSPs, or any other suitable hardware. The processor 142 is configured to operate as described in FIGS. 1-3. For example, the processor 142 may be configured to perform one or more operations of the operational flow 200 as described in FIG. 2, and one or more operations of the method 300 as described in FIG. 3.

The network interface 144 is configured to enable wired and/or wireless communications. The network interface 144 may be configured to communicate data between the server 140 and other devices, systems, or domains. For example, the network interface 144 may comprise an NFC interface, a Bluetooth interface, a Zigbee interface, a Z-wave interface, a radio-frequency identification (RFID) interface, a WIFI interface, a local area network (LAN) interface, a wide area network (WAN) interface, a metropolitan area network (MAN) interface, a personal area network (PAN) interface, a wireless PAN (WPAN) interface, a modem, a switch, and/or a router. The processor 142 may be configured to send and receive data using the network interface 144. The network interface 144 may be configured to use any suitable type of communication protocol.

The memory 146 may be a non-transitory computer-readable medium. The memory 146 may be volatile or non-volatile and may comprise read-only memory (ROM), random-access memory (RAM), ternary content-addressable memory (TCAM), dynamic random-access memory (DRAM), and/or static random-access memory (SRAM). The memory 146 may include one or more of a local database, a cloud database, a network-attached storage (NAS), etc. The memory 146 comprises one or more disks, tape drives, or solid-state drives, and may be used as an overflow data storage device, to store programs when such programs are selected for execution, and to store instructions and data that are read during program execution. The memory 146 may store any of the information described in FIGS. 1-3 along with any other data, instructions, logic, rules, or code operable to implement the function(s) described herein when executed by processor 142. For example, the memory 146 may store software instructions 148, interaction patterns 248, clone software application 160, clone application generating algorithm 166, user profile 170, original software application 150, pseudo data 232, anomaly detection algorithm 180, countermeasure protocols 240, syntax rules 214, alert messages 262, deviations 256, threshold percentages 230, and/or any other data or instructions. The software instructions 148 may comprise any suitable set of instructions, logic, rules, or code operable to execute the processor 142 and perform the functions described herein, such as some or all of those described in FIGS. 1-3.

The clone application generating algorithm 166 may be implemented by the processor 142 executing software instructions 148 and is generally configured to generate a clone software application 160 for a respective source software application 150. In some embodiments, the clone application generating algorithm 166 may be implemented by a neural network that is trained to analyze, interpret, and replicate the structural and functional components of the first software application as defined in the source code 152. In some embodiments, the clone application generating algorithm 166 may be implemented by natural language processing, programming language code interpretation techniques, among others. In some embodiments, the clone application generating algorithm 166 may implement feature extraction, text segmentation and tokenization to perform its functions. The neural network of the clone application generating algorithm 166 may be trained using a training dataset comprising various source code structures, each labeled with respective functional and visual attributes.

The server 140 may execute the clone application generating algorithm 166 to generate a clone for the source software application 150. In this process, the clone application generating algorithm 166 may parse the source software application 150 to analyze its operations and components based on the syntax rules 214 associated with the programming language of the source code 152 of the source software application 150. In some embodiments, the clone application generating algorithm 166 may copy the source files, including source code 152 and library files to a particular directory folder within the memory 146.

The source software application 150 may include source code 152 that when executed by a processor (e.g., processor 142, 122), causes the processor to run the source software application 150. The source software application 150 may include user interface elements 154 that provide visual interfaces to users to interact with the source software application 150. The source code 152 may include the code lines where the user interface elements 154 are defined and configured. The process of cloning the source software application 150 is described in greater detail in FIG. 2.

When the clone application generating algorithm 166 clones the source software application 150, the clone application generating algorithm 166 may output the clone software application 160 with source code 162 (which is a copy of the source code 152 of the source software application 150) and user interface elements 164 (which correspond to counterpart user interface elements 154 of the source software application 150). In some embodiments, the clone software application 160 may visually and functionally emulate the source software application 150. In some embodiments, the clone software application 160 may visually emulate the source software application 150 and present false, simulated, or pseudo data 232 (collectively referred to herein as pseudo data 232) in response to detecting user input compared to when the same input is provided to the source software application 150.

The user profile 170 associated with the user 102 may include credentials 172 of the user 102 and historical interaction patterns 174 of the user 102 interacting with the software application 150. The credentials 172 may include the username and password set by the user 102. The historical interaction patterns 174 may include information about navigation activity within different interface pages and interface elements 154 of the software application 150, interactions with user interface elements (e.g., clicking on buttons, hyperlinks, or other interactive components), text input into text fields, file operations (e.g., uploading or downloading files), detected mouse movement patterns (e.g., speed and trajectory), detected keyboard stroke patterns, detected network addresses (e.g., internet protocol (IP) addresses), detected geographical locations of the computing device 120 from which the software application 150 is accessed, and detected timestamps of the interaction sessions 252 with the software application 150, among others.

The anomaly detection algorithm 180 may be implemented by the processor 142 executing software instructions 148 and is generally configured to detect and mitigate anomalous interaction sessions 252 with the clone software application 160. In some embodiments, the anomaly detection algorithm 180 may comprise a support vector machine, neural networks, random forest, k-means clustering, etc. The anomaly detection algorithm 180 may be implemented by a plurality of neural network layers, convolutional neural network (CNN) layers, Long-Short-Term-Memory (LSTM) layers, Bi-directional LSTM layers, recurrent neural network layers, and the like. In some embodiments, the anomaly detection algorithm 180 may implement a natural language processing machine learning algorithm, text processing machine learning algorithm, among others.

In some embodiments, the anomaly detection algorithm 180 may be implemented by unsupervised, semi-supervised, or supervised machine learning techniques.

For example, the anomaly detection algorithm 180 may be trained by a training dataset that includes annotated samples of data packets of legitimate user interaction patterns 174 and anomalous user interaction patterns 248 with the clone software application 160. The training dataset may include features extracted from historical user sessions, where the extracted features may be labeled to indicate whether the respective user interaction pattern corresponds to legitimate or anomalous sessions. During the training phase, the anomaly detection algorithm 180 learns the association between each user interaction data and its respective labels and features. When trained, the anomaly detection algorithm 180 may perform inference on incoming or current user interaction 246 data to determine whether the current session 252 associated with the current user interaction 246 is anomalous. This process is described in greater detail in FIG. 2.

Operational Flow for Unauthorized Access Mitigation Through Instantiating a Security Interface FIG. 2 illustrates an example of the operational flow 200 of system 100 of FIG. 1 for unauthorized access mitigation through instantiating a security interface for a software application 150. In operation, in some embodiments, the server 140 may initiate the instantiation process for the source software application 150 automatically in response to detecting an attempt to access the source software application 150, in response to electronically receiving a request

106 to clone the source software application 150, for example, from a user or computing device 120, among others.

In an example scenario, assume that a user 202 attempts to access the software application 150 by opening a web browser application and entering the web domain address where the software application 150 is hosted and accessible or by pressing the user interface element (icon) of the software application 150 shown on the display screen of the computing device 120. The user 202 may be a bad actor or a legitimate user 102 who is authorized to access the source software application 150. The user 202 may attempt to access the software application 150 through any suitable way. The computing device 120 and/or the server 140 may capture these trigger events and trigger the instantiation process. For example, in response to detecting any of these trigger events, the computing device 120 may communicate the request 106 to clone the software application 150 to the server 140.

Creating a Clone Software Application

In response to receiving the request 106, the server 140 may initiate the creation of the clone software application 150. To this end, the server 140 may feed information about the software application 150 to the clone application generating algorithm 166, including a location in memory 146 where the source code 152 is located, and the source code 152, among others.

In response, the clone application generating algorithm 166 may access and parse the source code 152 to analyze its functional and visual attributes, including code elements that when executed by a processor, cause the processor to perform operations 220*a-n* and user interface elements 154. To this end, the clone application generating algorithm 166 may detect the programming language 212 in which the source code 152 is written based on the syntax rules 214 associated with the programming language 212. For example, the clone application generating algorithm 166 may detect the file extensions (e.g., .html, .js, .py, .java) and specific syntax patterns within the source code 152 to determine the programming language 212. If the source code 152 includes structured tags such as <html>, <head>, and <body>, the clone application generating algorithm 166 may determine that the programming language 212 is HyperText Markup Language (HTML). If the source code 152 includes function definitions using keywords such as def, the clone application generating algorithm 166 may determine that the programming language 212 is Python.

The clone application generating algorithm 166 may detect a set of characters 216 within the source code 152, where the set of characters 216 includes words, operators (e.g., comparison operands, mathematical operands, etc.), numbers, strings, or any other character. For example, the clone application generating algorithm 166 may tokenize each character 216 in each line of the source code 152 and determine to which token class, each of the character 216 belongs. Some characters 216 may be predefined and reserved by the syntax rules 214 as part of the programming language terms, such as def is reserved to define a function in Python, etc.

The clone application generating algorithm 166 may split the source code 152 into multiple portions 218*a-n*, where each portion 218*a-n* comprises one or more lines of code. For example, the clone application generating algorithm 166 may identify separation points within the source code 152 based on predefined delimiter characters 216 (e.g., section tags, such as <div> . . . </div> in markup languages) to logically split distinct functional components of the source code 152. In response, the clone application generating algorithm 166 may detect logical and relational dependencies between two or more characters 216 in each portion 218*a-n* of the source code 152 according to the syntax rules 214. For example, the clone application generating algorithm 166 may construct a dependency graph where nodes present code portions 218*a-b* (e.g., functions, classes, etc.) and edges may represent the detected dependencies between the nodes. The clone application generating algorithm 166 may use this information to determine the operation 220*a-n* of each portion 218*a-n*, respectively, based on the detected dependencies within each portion 218*a-n*.

The clone application generating algorithm 166 may further determine the dependency among the portions 218*a-n* to determine the hierarchical and sequential relationship between them. For example, if an output of a portion 218*a* is fed to another portion 218*n* as an input, the clone application generating algorithm 166 may determine the sequence of operations performed by these portions 218*a-n*.

The clone application generating algorithm 166 may detect the user interface elements 154 and the operations 220*a-n*. In this process, the clone application generating algorithm 166 may analyze the parsed set of characters 216 within the source code 152 to identify predefined tags 222 that correspond to user interface elements 154. The predefined tags 222 may be associated with a syntax rule 214 specific to the detected programming language 212. For example, if the source code 152 is in HTML, the clone application generating algorithm 166 may identify user interface elements 154 by detecting tags 222 such as <button>, <input>, <textarea>, <img>, and <a> that are indicative of buttons, text fields, text areas, images, and hyperlinks, respectively. In other examples, where the source code 152 is written in other programming languages, other tags 222 may be used to identify the user interface elements 154. In some examples, the user interface elements 154 may include buttons, text fields, images, hyperlinks, and navigation bars, among others that would be visually presented on display screens.

In response to detecting a predefined tag 222 corresponding to a user interface element 154, the clone application generating algorithm 166 may extract a set of visual attributes 224 associated with the detected user interface element. The set of visual attributes 224 may include at least one of size, color, or location parameters for the respective user interface element 154, among other attributes. The clone application generating algorithm 166 may detect the visual attributes 224 indicated in the cascading style sheets (CSS) code portion included in the source code 152. Thus, the clone application generating algorithm 166 may determine the functional attributes, such as operations 220*a-n* and visual attributes indicated in the source code 152.

In some embodiments, the clone application generating algorithm 166 may create the source code 162 for the clone software application 160 by copying the source code 152 of the source software application 150 into a designated memory directory to maintain for the clone software application 160. The source code 162 may include code portions 228*a-n*, where each of the portions 228*a-n* corresponds to the counterpart portion 218*a-n* of the source code 152. Thus, each of the portions 228*a-n* of the source code 162 may be configured to perform similar or corresponding operations 230*a-n*, respectively.

In some embodiments, the clone application generating algorithm 166 may configure each portion 228*a-n* of the source code 162 of the clone software application 160 to output pseudo data 232 instead of the expected output 260 that the source software application 150 would generate in the same input is provided to both source software application 150 and clone software application 160. To this end, in some embodiments, the clone application generating algorithm 166 may generate and insert additional code portions 258 to the source code 162 and/or modify one or more existing code portions 228*a-n* to dynamically generate pseudo data 232 when provided with inputs from users. In this process, the clone application generating algorithm 166 may generate code functions configured to generate pseudo data 232 when provided with inputs from users.

In some embodiments, the clone application generating algorithm 166 may implement inter-process function calls to intercept the actual or expected output generated by the portions 228*a-n* and replace them with pseudo data 232. The pseudo data 232 may resemble the expected output 260 that the source software application 150 would generate in response to associated user input. For example, the pseudo data 232 may have the same data structure and format as the expected output 260.

Instantiating the Clone Software Application

In response to creating and configuring the clone software application 160, the clone application generating algorithm 166 may instantiate the second software application 160 as a clone of the source software application 150.

In some embodiments, instantiating the clone software application 160 may include dynamically invoking and rendering the user interface 254 of the clone software application 160 which includes the user interface elements 164, where the user interface 254 corresponds to the user interface 264 of the source software application 150. The clone application generating algorithm 166 may generate the user interface 254 by replicating the structure, layout, and visual attributes 224 associated with the user interface 264 based on the detected user interface elements 154 and their corresponding properties extracted from the source code 152.

The clone application generating algorithm 166 may configure each of the set of user interface elements 164 to operate and emulate as a counterpart user interface element 154 of the source software application 150. In some embodiments, configuring each of the set of user interface elements 164 to operate as the counterpart user interface element 154 from among the set of user interface elements 154 comprises mapping each user interface element 164 from among the set of user interface elements 164 to a respective code portion that indicates the operation and design of the counterpart interface element 154 from among the set of user interface elements 164. Each user interface element 164, when rendered, visually and functionally corresponds to a counterpart user interface element 154. Thus, the user interface elements 164 may have the look and feel of the source software application 150.

The server 140 may electronically receive a request message 250 to access the source software application 150 that is hosted on the computing device 120, for example when the user 102 attempts to access the source software application 150, similar to that described above. The request message 250 may include credentials 172 of a user 102. In response to receiving the request message 250, the server 140 may deploy the instantiated software application 160 to the computing device 120 to be presented instead of the source software application 150.

The server 140 and/or the computing device 120 may autonomously capture the user interactions 246 on the clone software application 160, where the user interactions 246 may include information indicating how the user is navigating through the clone software application 160. The user interaction 246 may include information such as navigation activity within the second user interface, interactions with the second set of user interface elements (e.g., clicking on buttons, hyperlinks, or other interactive components), text input into text fields, file operations (e.g., uploading or downloading files), mouse movement patterns, keyboard stroke patterns, network address (e.g., IP address), geographical location of the computing device 120 from which the clone software application 160 is being accessed, and a timestamp of the interaction session with the clone software application 160, among others. For example, the computing device 120 may track and capture such information via sensors embedded within the computing device 120 over a period of time (e.g., five seconds, one minute, five minutes, etc.) and provide the user interactions 246 to the server 140.

The server 140 may derive the interaction pattern 248 from the tracked and captured user interactions 246. Driving the interaction pattern 248 from the user interaction 246 may include deriving structured data from unstructured data. For example, the server 140 may analyze raw interaction data, such as individual keystrokes, mouse movements, and navigation patterns, to extract meaningful features that characterize the pattern of the user interaction with the clone software application 160. The server 140 may apply a time-series analysis to determine the temporal relationship between consecutive user actions in navigating through the clone software application 160.

The server 140 may generate structured data as interaction pattern 248 by labeling each user interaction 246 with the associated action, such as in key-value pair format in JavaScript Object Notation (JSON) or Extensible Markup Language (XML) elements. For example, the server 140 may label a clicking action on a button with text as a label of clicking, among others.

Detecting Whether the Interaction Session is Anomalous

The server 140 may execute the anomaly detection algorithm 180 to determine whether the current interaction session is anomalous. To this end, the server 140 (e.g., via the anomaly detection algorithm 180) may evaluate the derived interaction pattern 248 against the previously known interaction pattern 174 associated with the credential 172 of the user 102 that is used to access the software application 150.

The server 140 (e.g., via the anomaly detection algorithm 180) may determine or establish whether the derived interaction pattern 248 deviates from the previously known interaction pattern 174. For example, the server 140 (e.g., via the anomaly detection algorithm 180) may compare each element of the derived interaction pattern 248 with the counterpart element of the previously known interaction pattern 174. In this process, the server 140 (e.g., via the anomaly detection algorithm 180) may compare each element, such as navigation sequences, response times, typing patterns, mouse movement, and interaction timing from the derived interaction pattern 248 with the counterpart element from the previously known interaction pattern 174. In some embodiments, the server 140 (e.g., via the anomaly detection algorithm 180) may derive a similarity index 234 between the derived interaction pattern 248 and the previously known interaction pattern 174, by generating a first embedding vector 236 that represents the derived interaction pattern 248 and a second embedding vector 238 that represents the previously known interaction pattern 174 in a three-dimensional vector space and determining a distance (e.g., Euclidean distance or cosine similarity) between the first and second embedding vectors 236 and 238, where the determined distance may indicate the similarity index 234. The server 140 (e.g., via the anomaly detection algorithm 180) may generate the embedding vector 236 by feeding the data indicating the user interaction 246 to the neural network of the anomaly detection algorithm 180.

The deviation 256 may inversely be proportional to the similarity index 234 between the derived interaction pattern 248 and the previously known interaction pattern 174. A similarity index 234 more than a threshold normalized number (e.g., more than 8 out of 10, where 10 indicates a match between the interaction pattern 248 and the previously known interaction pattern 174) may indicate that the current session is being conducted by the authorized user 102. A similarity index 234 less than a threshold normalized number (e.g., less than 4 out of 10) may indicate that the current session is being conducted by another user.

If the server 140 (e.g., via the anomaly detection algorithm 180) detects that the deviation 256 between the derived interaction pattern 248 and the previously known interaction pattern 174 is more than a threshold percentage 230, the server 140 may determine that the user is not authorized to access the software application 150. Otherwise, the server 140 may determine that the user is the authorized user 102 and can access the software application 150. In response to establishing that the deviation 256 between the derived interaction pattern 248 and the previously known interaction pattern 174 is more than the threshold percentage 230, the server 140 (e.g., via the anomaly detection algorithm 180) may classify the user 202 as not being authorized to access the software application 150. The server 140 (e.g., via the anomaly detection algorithm 180) may classify a first interaction session 252 associated with the derived interaction pattern 248 as anomalous.

The server 140 may facilitate the execution of one or more operations on the clone software application 160 in response to the user interactions 246 on the clone software application 160. For example, the server 140 may facilitate the execution of one or more operations on the clone software application 160 in response to the user interactions 246 by communicating an instruction message to computing device 120 to do so. Thus, the server 140 may reroute function calls to the clone software application 160 rather than directing them to the source software application 150. In other words, the server 140 may reroute any network packet (e.g., user interaction 246) to a designated endpoint (e.g., URL endpoint, API endpoint, WebSocket) associated with the clone software application 160 instead of the source software application 150. The clone software application 160 may simulate the expected behavior of the source software application 150 without exposing actual data on the user profile 170 or performing actual backend processing of the source software application 150.

The server 140 (e.g., via the computing device 120) may display on the user interface 254, pseudo data 232 in response to the tracked user interactions 246, where the pseudo data 232 may reflect an expected format of the output of the operation 218*a-n* on the source software application 150. The pseudo data 232 may be generated dynamically based on predefined templates, randomization algorithms, or pattern-matching techniques to resemble the counterpart expected output 260.

Mitigating the Anomalous Interaction Session

The server 140 may automatically invoke a countermeasure protocol 240 through system-level command code 242 in response to determining that the deviation 256 between the derived interaction pattern 248 and the previously known interaction pattern 174 is more than the threshold percentage 230. To this end, the server 140 may execute a preconfigured system-level command code 242, that may include a sequence of software instructions that, when executed by the processor (e.g., processor 122, 142), causes the processor to invoke a set of application-level command code 244 to invoke the countermeasure protocol 240. The system-level command code 242 may include software instructions that are interpreted by an operating system (OS) library and code to invoke system-level operations. For example, when executed, the system-level command code 242 may invoke a set of application-level command code 244 configured to carry out the security measures specific to the clone software application 160. The application-level command code 244 may include software instructions that are interpreted by the clone software application 160 to invoke application-specific operations comprising the countermeasure protocol 240. The application-level command code 244 may be executed by the processor (e.g., processor 122, 142) to perform their preconfigured operations.

In some embodiments, the countermeasure protocols 240 may include communicating alert messages 262 to one or more entities, where the alert message 262 may indicate the detected unauthorized attempt to access the source software application 150. In some examples, the one or more entities may include the computing device 120 associated with the legitimate user 102, a computing device associated with a network administrator, among others.

In some embodiments, the countermeasure protocols 240 may include adding a tag metadata to the derived interaction pattern 248 and/or associated computing device 120 from which the interaction pattern 248 is detected with respect to the access attempt to the software application 150, where the tag metadata may indicate that the derived interaction pattern 248 is anomalous and/or the associated computing device 120 is compromised, and/or the user profile 170 is compromised. The tagged derived interaction pattern 248 may be used to further refine the anomaly detection algorithm 180 to detect future user interactions with similar attributes (e.g., whose embedding vector is within a threshold distance from the embedding vector 238 in the vector space) as anomalous.

In some embodiments, the countermeasure protocols 240 may include dropping future network packets associated with future user interactions whose similarity index 234 between its embedding vector 236 and the embedding vector 238 is less than a threshold index (e.g., less than 40%, 50%, etc.) and/or the deviation 256 between its interaction pattern 248 and the previously known interaction pattern 174 is more than the threshold percentage 230.

Example Method for Unauthorized Access Mitigation Through Instantiating a Security Interface FIG. 3 illustrates an example flowchart of a method 300 for unauthorized access mitigation through instantiating a security interface for a source software application 150, according to some embodiments. Modifications, additions, or omissions may be made to method 300. Method 300 may include more, fewer, or other operations. For example, operations may be performed in parallel or in any suitable order. While at times it is discussed that the system 100, computing devices 120, server 140, or components of any of thereof perform some operations, any suitable system or components of the system may perform one or more operations of the method 300. For example, one or more operations of method 300 may be implemented, at least in part, in the form of software instructions 148, 130 of FIG. 1, stored on a tangible non-transitory machine-readable medium (e.g., memory 146, 128 of FIG. 1) that when run by one or more processors (e.g., processor 142, 122 of FIG. 1) may cause the one or more processors to perform operations 302-330.

At operation 302, the server 140 electronically receives a request 106 to clone a first software application 150, similar to that described in FIG. 2.

At operation 304, the server 140 parses source code 152 associated with the first software application 150, similar to that described in FIG. 2.

At operation 306, the server 140 detects a first set of user interface elements 154 and an operation 220*a-n* associated with the first software application 150, similar to that described in FIG. 2.

At operation 308, the server 140 instantiates a second software application 160 as a clone of the first software application 150, where the second software application 160 comprises a second set of user interface elements 164, similar to that described in FIG. 2.

At operation 310, the server 140 electronically receives a request message 250 to access the first software application 150 that is hosted on a computing device 120, where the request message 250 comprises a credential 172 of a first user 102, similar to that described in FIG. 2.

At operation 312, the server 140 deploys the second software application 160 to the computing device 120, similar to that described in FIG. 2.

At operation 314, the server 140 autonomously captures a set of user interactions 246 on the second software application 160, similar to that described in FIG. 2.

At operation 316, the server 140 derives an interaction pattern 248 from the captured set of user interactions 246, similar to that described in FIG. 2.

At operation 318, the server 140 evaluates the derived interaction pattern 248 against the previously known interaction pattern 174 associated with the credentials 172 included in the request message 250, similar to that described in FIG. 2.

At operation 320, the server 140 detects a deviation 256 between the derived interaction pattern 248 and the previously known interaction pattern 174, similar to that described in FIG. 2.

At operation 322, the server 140 establishes whether the detected deviation 256 is more than a threshold percentage 230, similar to that described in FIG. 2.

If it is determined that the deviation 256 is more than the threshold percentage 230, the method 300 proceeds to operation 324. Otherwise, the method 300 ends.

At operation 324, the server 140 classifies a first interaction session 252 associated with the derived interaction pattern 248 as anomalous, similar to that described in FIG. 2.

At operation 326, the server 140 facilitates an execution of the operation 220*a-n* on the second software application 160, similar to that described in FIG. 2.

At operation 328, the server 140 displays, on the second user interface 254, pseudo data 232 in response to the captured set of user interactions 246, similar to that described in FIG. 2.

At operation 330, the server 140 automatically invokes a countermeasure protocol 240 through system-level command code 242, similar to that described in FIG. 2. In some embodiments, the server 140 may proactively generate a clone software application 160 of each software application 150 automatically when the software application 150 is installed and provisioned on the computing devices 120 and/or server 140, and automatically instantiate and deploy the clone software application 160 to the computing device 120 when a request to access the software application 150 is received from the computing device 120. In some embodiments, when a request to access the software application 150 is received from the computing device 120, the server 140 may automatically generate, instantiate, and deploy a clone software application 160 for a given software application 150 to the computing device 120.

While several embodiments have been provided in the present disclosure, it should be understood that the system 100 and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented. In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein. To aid the Patent Office, and any readers of any patent issued on this application in interpreting the claims appended hereto, applicants note that they do not intend any of the appended claims to invoke 35 U.S.C. § 112(f), as it exists on the date of filing hereof, unless the words "means for" or "step for" are explicitly used in the particular claim.

The invention claimed is:

1. A system comprising:

a memory configured to store a first software application, wherein:

the first software application comprises a first user interface comprising a first web page, wherein the first web page comprises a first set of user interface elements; and the first software application is associated with a first source code to render the first user interface and perform a first operation;

a processor, operably coupled to the memory, and configured to:

electronically receive a request to clone the first software application;

in response to receiving the request, parse the first source code, wherein parsing the first source code comprises:

detecting a programming language in which the first source code is written based at least in part upon a syntax rule associated with the programming language;

detecting a set of characters within the first source code, wherein the set of characters comprises a set of words and a set of operators;

detecting a dependency between two or more characters in each portion of the first source code according to the syntax rule, wherein each portion of the first source code comprises one or more lines of code; and determining an operation of each portion of the first source code based at least in part upon the detected dependency within each portion of the first source code;

detect the first set of user interface elements and the first operation, wherein detecting the first set of user interface elements and the first operation comprises:

detecting, from among the set of words, a set of tags that are predefined, according to the syntax rule, to be indicative of the first set of user interface elements, wherein each tag from among the set of tags is indicative of a respective user interface element; and for at least a first tag, detecting a set of visual attributes associated with a first user interface element, wherein the set of visual attributes comprises at least one of a size, color, or a location associated with the first user interface element;

instantiate a second software application as a clone of the first software application, wherein instantiating the second software application comprises:

invoking a second user interface that corresponds to the first user interface, wherein the second user interface comprises a second set of user interface elements; and configuring each of the second set of user interface elements to operate as a counterpart user interface element from among the first set of user interface elements;

electronically receive a request message to access the first software application that is hosted on a computing device, wherein the request message comprises a credential associated with a first user;

in response to receiving the request message, deploy the second software application to the computing device;

autonomously capture a set of user interactions on the second software application, wherein the captured set of user interactions indicates navigating on the second user interface;

derive an interaction pattern from the captured set of user interactions;

evaluate the derived interaction pattern against a previously known interaction pattern associated with the credential associated with the first user;

detect a deviation between the derived interaction pattern and the previously known interaction pattern;

establish that the deviation between the derived interaction pattern and the previously known interaction pattern is more than a threshold percentage; and in response to establishing that the deviation between the derived interaction pattern and the previously known interaction pattern is more than the threshold percentage:

classify a first user interaction session associated with the derived interaction pattern as anomalous;

facilitate an execution of the first operation on the second software application;

display, on the second user interface, pseudo data in response to the captured set of user interactions, wherein the pseudo data reflects an expected format of an output of the first operation on the first software application; and automatically invoke a countermeasure protocol through a system-level command code, wherein:

the system-level command code is preconfigured, when executed by the processor, causes the processor to invoke a set of application-level command code to invoke the countermeasure protocol;

the system-level command code comprises software instructions that are interpreted by an operating system (OS) library to invoke system-level operations; and the application-level command code comprises software instructions that are interpreted by the second software application to invoke application-specific operations comprising the countermeasure protocol.

2. The system of claim 1, wherein the countermeasure protocol comprises communicating an alert message that indicates an unauthorized attempt to access the first software application.

3. The system of claim 1, wherein the processor is further configured to:

detect a geographical location from where the second software application is accessed by the first user;

detect a network address associated with the computing device from which the second software application is accessed by the first user, wherein the network address comprises an Internet Protocol (IP) address; and detect a timestamp associated with the captured set of user interactions, wherein the derived interaction pattern comprises the captured set of user interactions, the detected geographical location, the detected network address, and the detected timestamp.

4. The system of claim 1, wherein instantiating the second software application further comprises generating a second source code by copying the first source code.

5. The system of claim 1, wherein the captured set of user interactions comprises at least one of:

navigating on the second user interface;

clicking on any of the second set of user interface elements;

entering text into a text field within the second user interface;

uploading a file;

downloading a file;

a mouse movement pattern; or a keyboard stroke pattern.

6. The system of claim 1, wherein configuring each of the second set of user interface elements to operate as the counterpart user interface element from among the first set of user interface elements comprises mapping each user interface element from among the second set of user interface elements to a respective code portion that indicates an operation and a design of the counterpart interface element from among the first set of user interface elements.

7. The system of claim 1, wherein each user interface, from among the second set of user interface elements, when rendered, visually and functionally corresponds to a counterpart user interface from among the first set of user interface elements.

8. A method comprising:

electronically receiving a request to clone a first software application, wherein:

the first software application comprises a first user interface comprising a first web page, wherein the first web page comprises a first set of user interface elements; and the first software application is associated with a first source code to render the first user interface and perform a first operation;

in response to receiving the request, parsing the first source code, wherein parsing the first source code comprises:

detecting a programming language in which the first source code is written based at least in part upon a syntax rule associated with the programming language;

detecting a set of characters within the first source code, wherein the set of characters comprises a set of words and a set of operators;

detecting a dependency between two or more characters in each portion of the first source code according to the syntax rule, wherein each portion of the first source code comprises one or more lines of code; and determining an operation of each portion of the first source code based at least in part upon the detected dependency within each portion of the first source code;

detecting the first set of user interface elements and the first operation, wherein detecting the first set of user interface elements and the first operation comprises:

detecting, from among the set of words, a set of tags that are predefined, according to the syntax rule, to be indicative of the first set of user interface elements, wherein each tag from among the set of tags is indicative of a respective user interface element; and for at least a first tag, detecting a set of visual attributes associated with a first user interface element, wherein the set of visual attributes comprises at least one of a size, color, or a location associated with the first user interface element;

instantiating a second software application as a clone of the first software application, wherein instantiating the second software application comprises:

invoking a second user interface that corresponds to the first user interface, wherein the second user interface comprises a second set of user interface elements; and configuring each of the second set of user interface elements to operate as a counterpart user interface element from among the first set of user interface elements;

electronically receiving a request message to access the first software application that is hosted on a computing device, wherein the request message comprises a credential associated with a first user;

in response to receiving the request message, deploying the second software application to the computing device;

autonomously capturing a set of user interactions on the second software application, wherein the captured set of user interactions indicates navigating on the second user interface;

deriving an interaction pattern from within the captured set of user interactions;

evaluating the derived interaction pattern against a previously known interaction pattern associated with the credential associated with the first user;

detecting a deviation between the derived interaction pattern and the previously known interaction pattern;

establishing that the deviation between the derived interaction pattern and the previously known interaction pattern is more than a threshold percentage; and in response to establishing that the deviation between the derived interaction pattern and the previously known interaction pattern is more than the threshold percentage:

classifying a first user interaction session associated with the derived interaction pattern as anomalous;

facilitating an execution of the first operation on the second software application;

displaying, on the second user interface, pseudo data in response to the captured set of user interactions, wherein the pseudo data reflects an expected format of an output of the first operation on the first software application; and automatically invoking a countermeasure protocol through a system-level command code, wherein:

the system-level command code is preconfigured, when executed by a processor, causes the processor to invoke a set of application-level command code to invoke the countermeasure protocol;

the system-level command code comprises software instructions that are interpreted by an operating system (OS) library to invoke system-level operations; and the application-level command code comprises software instructions that are interpreted by the second software application to invoke application-specific operations comprising the countermeasure protocol.

9. The method of claim 8, wherein the countermeasure protocol comprises communicating an alert message that indicates an unauthorized attempt to access the first software application.

10. The method of claim 8, further comprising:

detecting a geographical location from where the second software application is accessed by the first user;

detecting a network address associated with the computing device from which the second software application is accessed by the first user, wherein the network address comprises an Internet Protocol (IP) address; and detecting a timestamp associated with the captured set of user interactions, wherein the derived interaction pattern comprises the captured set of user interactions, the detected geographical location, the detected network address, and the detected timestamp.

11. The method of claim 8, wherein instantiating the second software application further comprises generating a second source code by copying the first source code.

12. The method of claim 8, wherein the captured set of user interactions comprises at least one of:

navigating on the second user interface;

clicking on any of the second set of user interface elements;

entering text into a text field within the second user interface;

uploading a file;

downloading a file;

a mouse movement pattern; or a keyboard stroke pattern.

13. The method of claim 8, wherein configuring each of the second set of user interface elements to operate as the counterpart user interface element from among the first set of user interface elements comprises mapping each user interface element from among the second set of user interface elements to a respective code portion that indicates an operation and a design of the counterpart interface element from among the first set of user interface elements.

14. The method of claim 8, wherein each user interface, from among the second set of user interface elements, when rendered, visually and functionally corresponds to a counterpart user interface from among the first set of user interface elements.

15. A non-transitory computer-readable medium storing instructions that when executed by a processor, cause the processor to:

electronically receive a request to clone a first software application, wherein:

the first software application comprises a first user interface comprising a first web page, wherein the first web page comprises a first set of user interface elements; and the first software application is associated with a first source code to render the first user interface and perform a first operation;

in response to receiving the request, parse the first source code, wherein parsing the first source code comprises:

detecting a programming language in which the first source code is written based at least in part upon a syntax rule associated with the programming language;

detecting a set of characters within the first source code, wherein the set of characters comprises a set of words and a set of operators;

detecting a dependency between two or more characters in each portion of the first source code according to the syntax rule, wherein each portion of the first source code comprises one or more lines of code; and determining an operation of each portion of the first source code based at least in part upon the detected dependency within each portion of the first source code;

detect the first set of user interface elements and the first operation, wherein detecting the first set of user interface elements and the first operation comprises:

detecting, from among the set of words, a set of tags that are predefined, according to the syntax rule, to be indicative of the first set of user interface elements, wherein each tag from among the set of tags is indicative of a respective user interface element; and for at least a first tag, detecting a set of visual attributes associated with a first user interface element, wherein the set of visual attributes comprises at least one of a size, color, or a location associated with the first user interface element;

instantiate a second software application as a clone of the first software application, wherein instantiating the second software application comprises:

invoking a second user interface that corresponds to the first user interface, wherein the second user interface comprises a second set of user interface elements; and configuring each of the second set of user interface elements to operate as a counterpart user interface element from among the first set of user interface elements;

electronically receive a request message to access the first software application that is hosted on a computing device, wherein the request message comprises a credential associated with a first user;

in response to receiving the request message, deploy the second software application to the computing device;

autonomously capture a set of user interactions on the second software application, wherein the captured set of user interactions indicates navigating on the second user interface;

derive an interaction pattern from the captured set of user interactions;

evaluate the derived interaction pattern against a previously known interaction pattern associated with the credential associated with the first user;

detect a deviation between the derived interaction pattern and the previously known interaction pattern;

establish that the deviation between the derived interaction pattern and the previously known interaction pattern is more than a threshold percentage; and in response to establishing that the deviation between the derived interaction pattern and the previously known interaction pattern is more than the threshold percentage:

classify a first user interaction session associated with the derived interaction pattern as anomalous;

facilitate an execution of the first operation on the second software application;

display, on the second user interface, pseudo data in response to the captured set of user interactions, wherein the pseudo data reflects an expected format of an output of the first operation on the first software application; and automatically invoke a countermeasure protocol through a system-level command code, wherein:

the system-level command code is preconfigured, when executed by the processor, causes the processor to invoke a set of application-level command code to invoke the countermeasure protocol;

the system-level command code comprises software instructions that are interpreted by an operating system (OS) library to invoke system-level operations; and the application-level command code comprises software instructions that are interpreted by the second software application to invoke application-specific operations comprising the countermeasure protocol.

16. The non-transitory computer-readable medium of claim 15, wherein the countermeasure protocol comprises communicating an alert message that indicates an unauthorized attempt to access the first software application.

17. The non-transitory computer-readable medium of claim 15, wherein the instructions further cause the processor to:

detect a geographical location from where the second software application is accessed by the first user;

detect a network address associated with the computing device from which the second software application is accessed by the first user, wherein the network address comprises an Internet Protocol (IP) address; and detect a timestamp associated with the captured set of user interactions, wherein the derived interaction pattern comprises the captured set of user interactions, the detected geographical location, the detected network address, and the detected timestamp.

18. The non-transitory computer-readable medium of claim 15, wherein instantiating the second software application further comprises generating a second source code by copying the first source code.

19. The non-transitory computer-readable medium of claim 15, wherein the captured set of user interactions comprises at least one of:

navigating on the second user interface;

clicking on any of the second set of user interface elements;

entering text into a text field within the second user interface;

uploading a file;

downloading a file;

a mouse movement pattern; or a keyboard stroke pattern.

20. The non-transitory computer-readable medium of claim 15, wherein the first set of user interface elements comprises at least one of:

a button;

a text field, an image;

a hyperlink; or a navigation bar.

* * * * *